(12) United States Patent
Deflandre

(10) Patent No.: US 9,359,140 B2
(45) Date of Patent: Jun. 7, 2016

(54) COMPONENT FEED DEVICE AND UNIT COMPRISING SUCH A DEVICE

(76) Inventor: Hervé Deflandre, Fleurbaix (FR)

( * ) Notice: Subject to any disclaimer, the term of this patent is extended or adjusted under 35 U.S.C. 154(b) by 281 days.

(21) Appl. No.: 13/823,745

(22) PCT Filed: Sep. 15, 2011

(86) PCT No.: PCT/FR2011/052122
§ 371 (c)(1),
(2), (4) Date: May 28, 2013

(87) PCT Pub. No.: WO2012/035269
PCT Pub. Date: Mar. 22, 2012

(65) Prior Publication Data
US 2013/0233677 A1    Sep. 12, 2013

(30) Foreign Application Priority Data
Sep. 15, 2010   (FR) ...................... 10 57364

(51) Int. Cl.
*B65G 47/14*   (2006.01)
*B65G 47/00*   (2006.01)
(Continued)

(52) U.S. Cl.
CPC ............... *B65G 15/58* (2013.01); *B65G 15/44* (2013.01); *B65G 47/1407* (2013.01); *B65G 47/1442* (2013.01); *B65G 47/1471* (2013.01); *B65G 47/1492* (2013.01)

(58) Field of Classification Search
CPC ............... B65G 47/14; B65G 47/1471; B65G 47/1442; B65G 47/1492
See application file for complete search history.

(56) References Cited

U.S. PATENT DOCUMENTS 2,800,216 A *  7/1957 Muller ................... B65G 47/14
                                               198/397.03
2,916,133 A * 12/1959 Copping ............ B65G 47/1471
                                               198/397.06
(Continued)

FOREIGN PATENT DOCUMENTS

DE      15 31 068      3/1970
DE      29 05 492      8/1980
(Continued)

OTHER PUBLICATIONS

International Search Report dated Mar. 22, 2012 from International Application No. PCT/FR2011/052122 filed Sep. 15, 2011, pp. 1-11.
(Continued)

*Primary Examiner* — Thomas Randazzo
(74) *Attorney, Agent, or Firm* — MH2 Technology Law Group, LLP

(57) ABSTRACT

The invention provides a component feed device (2) enabling metered delivery of components to a workstation, the device comprising a conveyor belt (6) having an upper strand (7) and a lower strand (8), drive means (9, 10, 13, 14, 16) for driving the conveyor belt (6) in a loop, and holder means configured to contain the components on the upper strand (7) of the conveyor belt (6). The upper strand (7) is configured to form a container, in particular a bowl-shaped container, having an upstream face (11a), a bottom (11b), and a downstream face (11c), said upstream and downstream faces being configured to encourage components to move down under gravity into the bottom. The conveyor belt (6) has an outside face (6a) and an inside face (6b), the outside face having component retaining means (19) configured to retain the components resting on said outside face (6a) at least when they are situated on the downstream face (11c).

22 Claims, 1 Drawing Sheet

(51) Int. Cl.
 *B65G 15/58* (2006.01)
 *B65G 15/44* (2006.01)

(56) References Cited

U.S. PATENT DOCUMENTS

| | | | | |
|---|---|---|---|---|
| 3,190,433 | A * | 6/1965 | Blaukschein, Jr. | B65G 47/1471 193/44 |
| 3,640,377 | A * | 2/1972 | Benoit | B65G 17/063 198/692 |
| 3,924,732 | A * | 12/1975 | Leonard | B65G 47/1471 198/397.06 |
| 4,060,111 | A * | 11/1977 | Burks | B65G 47/1471 141/231 |
| 4,232,778 | A * | 11/1980 | Rysti | B65G 47/14 198/443 |
| 4,843,795 | A * | 7/1989 | Shroyer | B65B 35/56 198/400 |
| 5,394,972 | A * | 3/1995 | Aidlin | B65G 47/1471 198/393 |
| 6,164,501 | A | 12/2000 | Stradella | |
| 6,257,393 | B1 * | 7/2001 | Phelps | B65G 47/1471 198/397.01 |
| 6,360,879 | B1 * | 3/2002 | Crawford | B65G 15/62 198/821 |
| RE45,025 | E * | 7/2014 | Evers, Jr. | B65G 47/1471 198/393 |
| 2004/0011623 | A1 * | 1/2004 | Sala | B65G 47/1471 198/373 |
| 2004/0069156 | A1 * | 4/2004 | Reed | B65G 47/1471 99/450.1 |
| 2010/0163373 | A1 * | 7/2010 | Giebler | B65G 47/1471 198/803.16 |

FOREIGN PATENT DOCUMENTS

| | | | |
|---|---|---|---|
| DE | 30 48 231 | 7/1982 | |
| DE | 37 42 728 | 3/1989 | |
| DE | 3742728 C1 * | 3/1989 | B65G 47/14 |
| DE | 198 39 664 | 3/1999 | |
| DE | 19839664 * | 3/1999 | B65G 47/14 |
| DE | 10341481 A1 * | 4/2005 | B07B 13/05 |
| EP | 0 542 258 | 5/1993 | |
| FR | 1 593 909 | 6/1970 | |
| FR | 2 727 096 | 5/1996 | |
| WO | 02/20377 | 3/2002 | |

OTHER PUBLICATIONS

English Translation of Written Opinion from International Application No. PCT/FR2011/052122 dated Sep. 15, 2010, pp. 1-7.

* cited by examiner

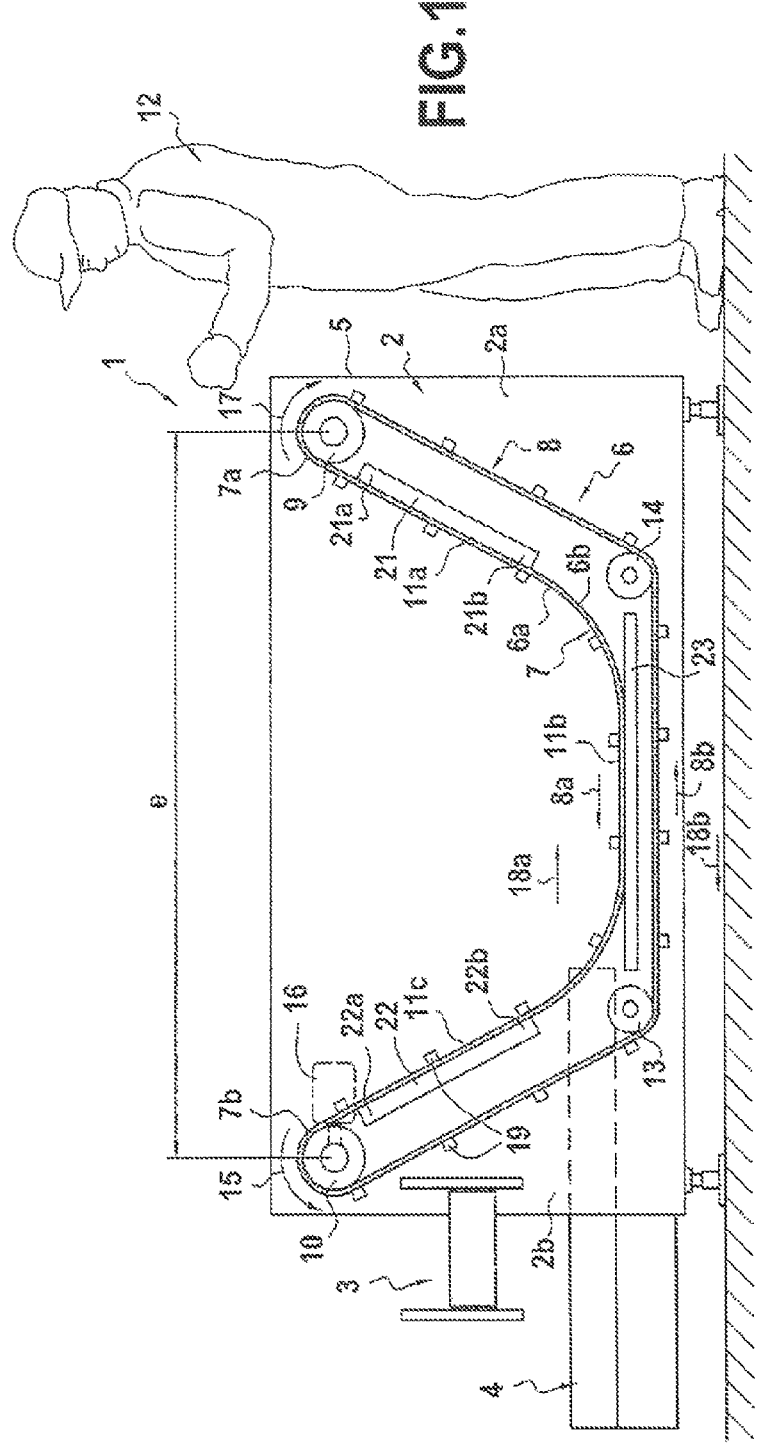
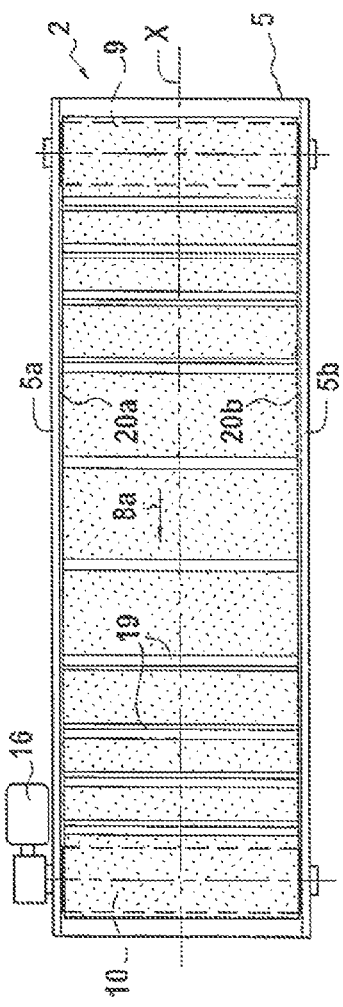

COMPONENT FEED DEVICE AND UNIT COMPRISING SUCH A DEVICE

CROSS-REFERENCE TO RELATED APPLICATIONS

This application is a U.S. National Stage application of PCT/FR2011/052122 filed Sep. 15, 2011, which claims priority to French patent application 1057364 filed Sep. 15, 2010, the entire disclosures of which are hereby incorporated herein by reference in their entireties.

The invention relates to a component feed device enabling metered delivery of said components to a workstation so as to guarantee that it has a regular or continuous supply. The invention also provides an installation comprising such component feed devices, and workstations to which said components are taken in order to be used.

Preferably, but not exclusively, the components are stoppers for bottles, e.g. made of aluminum, or indeed small bottles.

Various types of component feed device are presently known.

In a first known type, the device consists in vibrating bowls that generally present the drawback of being bulky on workstations and of being not very ergonomic.

In a second known type, the device consists in a metering hopper that is filled with components, the metering hopper having a metering system at its bottom end for allowing components to pass through said metering system, said components being extracted from the hopper and dropping onto a conveyor based on a belt or on rollers, for example. A drawback with such metering hoppers lies with the ergonomics of the workstation. Such metering hoppers are generally arranged at a greater or lesser height so as to enable components to drop under gravity onto the belt or roller conveyor. As a result an operator needs to use a step-up stool or the equivalent in order to reach the top portion of the metering hopper and fill it with components. Such an operation can be more or less difficult, depending on the weight of the components, which components are generally in packages of considerable volume.

A third type of component feed device is also known, which device comprises a conveyor belt that extends horizontally and longitudinally. That conveyor belt travels around a loop, enabling components arranged on its upper strand to be advanced. A bin is arranged above the conveyor belt so as to contain the items resting on the upper strand of the conveyor belt and prevent the components from dropping over the sides of the conveyor belt. In its downstream face, adjacent to the downstream portion of the conveyor belt, the bin has a window defining a zone through which components traveling on the conveyor belt can pass. Thus, the components are placed in bulk in the bin and they rest on the conveyor belt, which moves to convey the components towards its downstream portion. The components thus come into contact with the downstream face of the bin, and only those components that are in register with the window adjacent to the upper strand of the conveyor belt are capable of passing through the downstream face of the bin. Once the components have passed through the window, they are conveyed by the downstream portion of the conveyor belt, either to an intermediate conveyor or else directly to a workstation, for example. A drawback of that type of device is that passing components through the window when the bin is full of components leads to jamming and to components passing through the window jerkily, so that small bunches of components are conveyed by the conveyor belt at more or less regular intervals, thereby failing to convey components continuously to the workstation as a function of requirements. Another drawback is the need to have a bin that has lateral sides, i.e. its sides that correspond to the sides of the conveyor belt, that are arranged adjacent to and facing said sides of the conveyor belt and that are flared in order to avoid components jamming or blocking as they move inside the bin. Such flaring of the sides of the bin has the drawback of increasing the overall size of the feed device. In addition, with that type of device it is necessary to distribute the components that are arranged in bulk inside the bin in a manner that is suitable to ensure that the components are regularly spread out on the conveyor belt inside said bin in order to limit jamming or blocking of the components. That requires access to the sides of the hopper or bin while it is being filled.

The present invention seeks to mitigate the above mentioned drawbacks, and to this end it provides a component feed device enabling the conveying of said components to be properly metered, in particular at a workstation, and making it possible without damaging said components.

To this end, the component feed device comprises a conveyor belt mounted in a loop and having an upper strand on which the components rest while they are being transported and a lower strand for returning empty. It can be understood that the components resting on the upper strand of the conveyor belt move from the rear end towards the front of the component feed device because the conveyor belt moves or travels around a loop. For this purpose, the component feed device also includes drive means for driving the conveyor belt around a loop. Likewise the component feed device has holder means configured to contain the components on the upper strand of the belt so as to prevent the components for dropping over the sides of the conveyor belt while it is being driven around its loop. Furthermore, in remarkable manner, the upper strand of the conveyor belt is configured to form a container, in particular a bowl-shaped container that has an upstream face corresponding to the upstream portion of said upper strand of the conveyor belt, a bottom corresponding to the central portion of said upper strand of the conveyor belt, and a downstream face corresponding to the downstream portion of said upper strand of the conveyor belt. These upstream and downstream faces are configured to encourage components to move down under gravity into the bottom of the container. Furthermore, the conveyor belt has an outside face and an inside face, with the components being in contact with the outside face while they are resting on the upper strand of the belt. This outside face has component retaining means configured to retain the components resting on said outside face, at least when they are situated on the downstream face of the container.

Thus, in the component feed device of the present invention, it can be understood that the operator can advantageously fill the feed device with components by pouring said components directly onto the upstream face of the container, thereby enabling the components to drop under gravity into the bottom of said container because of the angle of inclination of said upstream face. In addition, the movement of the upper strand of the conveyor belt in a downstream direction tends to move the components placed in bulk in the container and resting on said upper strand of the belt, with the component retaining means enabling the components to be retained on the upper strand of the belt while it is moving and said components are situated in the region of the downstream face of the container; thus, only retained components remain on said downstream face, and excess components that are situated on said downstream face but that are not retained, fall back under gravity into the bottom of the container. In addition, the components that are retained on the downstream face are then discharged via the downstream end of the conveyor belt. This ensures that components are conveyed in regular manner without any risk of jamming or blocking.

In the invention, the holder means are constituted by two plates arranged vertically adjacent to respective sides of the conveyor belt. This vertical arrangement of the two plates presents the advantage of limiting the overall size of the component feed device in the vicinity of its sides, and also makes it possible to place a plurality of component feed devices beside one another. This arrangement of a plurality of component feed devices beside one another can also be envisaged because components are poured into the container via its upstream face and not via its side faces as is the case in the prior art device. Furthermore, it is possible to envisage using vertical plates in contrast with the prior art feed device that requires a bin having flared sides, because in the component feed device of the present invention the shaping of the conveyor belt in the form of a container serves to stir the components, thereby preventing them blocking.

Advantageously, the component feed device has a downstream drum at its downstream end that is arranged to return the conveyor belt. Likewise, the component feed device has an upstream drum at its upstream end that is arranged to return the conveyor belt. In addition, the component feed device has two return rollers that are arranged to bear against the inside face of the lower strand of the conveyor belt. Furthermore, the upstream and downstream drums are spaced apart from each other in a configuration that allows the upper strand of the conveyor belt to be kept slack, the two return rollers being arranged at a lower level than the upstream and downstream drums so as to avoid any contact between the inside faces of the upper and lower strands of the conveyor belt. This arrangement makes it possible to provide a bowl-shaped container.

In the invention, the drive means of the conveyor belt comprise at least one motor configured to drive at least one of the upstream and downstream drums in rotation. It is possible to envisage using a motor associated with only one drum, preferably the downstream drum, thereby applying traction to the upper strand of the conveyor belt that conveys components downstream. Nevertheless, in order to enable the conveyor belt to be moved both forwards and rearwards, it is possible to envisage using two motors, one driving the downstream drum in rotation and the other driving the upstream drum in rotation. In addition, in order to use only one motor, it is also possible to envisage using drive means that comprise a motor driving the downstream drum and a transmission system arranged between the drive motor and the upstream drum, or an inverse configuration.

In the invention, two support plates, an upstream support plate and a downstream support plate, are arranged at an angle of inclination under the upper strand of the conveyor belt, respectively in the regions of the upstream and downstream faces of the container, and by bearing against the inside face of said upper strand of the conveyor belt, the upstream and downstream support plates form a V-shape between each other. This has the advantage of supporting the upper strand of the conveyor belt and of maintaining a preferred angle of inclination for the upstream and downstream faces of the conveyor, where this angle of inclination can have an influence on the effectiveness of the retaining means.

Preferably, in the invention, adjustment means are configured to modify the angle of inclination of the upstream and downstream support plates. This presents the advantage of providing accurate adjustment as a function of the type of components arranged in the feed device.

Preferably, the component feed device of the invention includes a central support plate arranged under the upper strand of the conveyor belt in the region of the bottom, this central support plate bearing against the inside face of the upper strand of said conveyor belt, said central support plate being configured to avoid any contact between the bottom with the lower strand of the conveyor belt.

In the invention, the retaining means are constituted by slats arranged transversely, i.e. perpendicularly to the longitudinal direction of the belt, on the outside face of said conveyor belt, with gaps between each of the slats. The dimensions of the slats depend on the type of components, i.e. on the dimensions of said components, said slats serving to retain the components when they are situated on the sloping downstream face of the container. The slats are preferably spaced apart from one another by a distance lying in the range 30 centimeters (cm) to 70 cm. Also preferably, the spacing between two successive slats is much greater than the dimension of the components, and in particular is not less than ten times the largest dimension of a component being metered by the feed device of the invention. Also preferably, slats are of a height that corresponds substantially to the thickness of the component. If the component is a cylindrical stopper for a bottle, the height of the slat corresponds substantially to the length of the stopper. This configuration makes it possible to improve the regularity with which components are fed in order to avoid any jamming at the outlet from the device.

In another aspect of the invention, the invention provides an installation for packaging liquids in bottles that are closed by means of stoppers, said installation comprising at least one device for feeding stopper type components of the present invention. In addition, this installation of the invention comprises a removal conveyor arranged below the downstream end of the conveyor belt, said removal conveyor feeding a workstation for stopping bottles.

The invention also provides the use of a feed device of the invention wherein components are poured into the enclosure in such a manner as to fill the bowl-shaped container completely before putting said device into operation.

Advantageously, the components are poured into the enclosure (5) in such a manner as to fill the bowl-shaped container, the components being poured to a depth corresponding to the height of the downstream cylinder (10).

Preferably, but not exclusively, the components are stoppers for bottles.

Other characteristics of the present invention appear on reading the following description that relates to a preferred but non-limiting design, shown by means of Figures, in which;

FIG. 1 shows an installation having a component feed device of the present invention; and FIG. 2 is a plan view of the component feed device.

FIG. 1 shows an installation 1 intended in particular for packaging liquids in bottles that are closed by means of stoppers. FIG. 1 shows a feed device 2 for feeding stopper type components, a removal conveyor 3, and a workstation 4 consisting in particular in a station for filling bottles with liquid and a station for stopping said bottles with stoppers. Nevertheless, it is possible to envisage implementing such an installation for other applications without going beyond the ambit of the present invention. Under such circumstances, it is appropriate to adapt the component feed device 2 as a function of the type of component to be taken to the workstation 4.

The component feed device 2 comprises an enclosure 5 having a conveyor belt 6 incorporated therein. The enclosure is preferably closed at least on its sides so as to keep the components on the conveyor belt 6. The conveyor belt is preferably housed entirely within the volume of the enclosure 5. The conveyor belt 6 extends longitudinally inside the enclosure 5. The longitudinal direction is defined as the direction of the axis X shown in FIG. 2. The conveyor belt 6 has an upper strand 7 and a lower strand 8, given that it is mounted in a loop, as can be seen in FIG. 1.

The conveyor belt 6 has an outside face 6a and an inside face 6b as shown in FIG. 1. The conveyor belt travels in the direction of arrows 8a and 8b, thereby moving components resting on the upper strand 7 of the conveyor belt 6 in the direction of arrow 8a. The conveyor belt 6 rotates around a loop; it can thus be understood that the lower strand 8 of the belt moves on the contrary in the direction of arrow 8b, while empty, i.e. when not transporting any component.

In FIGS. 1 and 2, it can be seen that a drum 9 is present at the upstream end of the feed device 2, and that a drum 10 is present at the downstream end of said feed device 2. In FIG. 1, it can be seen that the upstream and downstream drums 9 and 10 are preferably arranged at the same height. Nevertheless, it is possible to envisage a height offset between these upstream and downstream drums 9 and 10 without going beyond the ambit of the invention, and in particular to envisage placing the downstream drum 10 at a greater height than the upstream drum 9. These two drums are also arranged transversely, i.e. on respective axes perpendicular to the longitudinal axis X, and they are spaced apart from each other by a spacing "e" of dimension smaller than the length of the upper strand 7 of the belt 6, when the belt is under tension. This enables the upper strand 7 of the conveyor belt 6 to be kept slack, so that it takes up a bowl shape as shown in FIG. 1, thereby enabling components to be contained when they are poured into the enclosure 5.

The bowl has an upstream face 11a, a bottom 11b, and a downstream face 11c, the upstream and downstream faces 11a and 11c slope upwards and outwards respectively upstream and downstream, given the bowl shape. The angle of inclination relative to a horizontal plane is preferably not less than 30°. Thus, when the operator 12 pours in components, the operator takes up a position at the upstream end 2a of the feed device 2 and pours said components over via the top of the enclosure 5, said components dropping onto the sloping upstream face 11a. Because of the existing slope or angle of inclination of the upstream face 11a, it can be understood that the components fall or slide under gravity into the bottom 11b of the bowl. In addition, it can be seen in FIGS. 1 and 2 that this bowl has a volume that is capable of containing a certain quantity of components arranged in bulk. The capacity of the bowl-shaped container should be adapted to the volume of the components and to the intended application.

It can also be seen in FIG. 1 that there are two return rollers 13 and 14 arranged transversely in the feed device 1 and bearing against the inside face 6b on the lower strand 8 of the conveyor belt 6, as shown in FIG. 1. FIG. 1 also shows that the upstream and downstream drums 9 and 10 are in contact with the inside face 6b of the conveyor belt 6 and that they adhere thereto so as to avoid any slip between the conveyor belt 6 and the upstream and downstream drums 9 and 10. Thus, driving at least one of the upstream and/or downstream drums 9 and/or 10 in rotation serves to move the conveyor belt 6.

The travel direction along the arrows 8a and 8b shown in FIG. 1 is obtained by one of the upstream and downstream drums 9 and 10 together with the return rollers 13 and 14 being rotated in the counterclockwise direction as shown by arrow 15 in FIG. 1. In FIG. 1, it can be seen that a motor 16 is arranged in the top portion of the downstream end 2b of the enclosure, this drive motor meshing with the downstream drum 10 so as to enable it to be rotated in the counterclockwise direction shown by arrow 15, the rotary drive to the downstream drum 10 serving to move the conveyor belt 6 around a loop in the direction of arrows 8a and 8b shown in FIG. 1. This rotary drive of the downstream drum 10 serves to apply traction on the downstream end 7b of the upper strand 7 of the conveyor belt 6. The drive motor 16 is preferably capable of rotating in either direction and a transmission system is provided between said motor 16 and the upstream drum 9 so as to be able to cause the upstream drum 9 to rotate in the clockwise direction shown by arrow 17 in FIG. 1, thereby reversing the direction of rotation of the conveyor belt 6 which then moves in the direction of arrows 18a and 18b, with drive via the upstream drum 9 providing traction at the upstream end 7a of the upper strand 7 of said conveyor belt 6. Naturally, it would be possible to provide two separate drive motors respectively for imparting rotary drive in a counterclockwise first direction as shown by arrow 15 to the downstream drum 10 and in a clockwise second direction as shown by arrow 17 to the upstream drum 9.

In FIGS. 1 and 2, there can be seen slats 19 mounted transversely on the outside face 6a of the conveyor belt 6, preferably with regular spacing between said slats 19. The slats 19 are dimensioned so as to be capable of holding components that are placed inside the bowl-shaped container. The distance between two slats preferably lies in the range 30 cm to 70 cm. Preferably, but not necessarily, the height of a slat lies in the range 1 cm to 3 cm. Also preferably, the height of a slat corresponds to the thickness of a component. When the conveyor belt 6 moves in the direction of arrows 8a, 8b, it can be understood that the components that are directly in contact on the outside face 6a of the upper strand 7 of the conveyor belt 6 are taken towards the downstream end 7b of said upper strand 7. In the region of the downstream face 11c of the bowl, the slats 17 serve to retain the components resting directly on the upper strand 7 of the conveyor belt 6, while excess components are sent back to the bottom 11b of the bowl because of the angle of inclination of the downstream face 11c, the slats 19 on the contrary preventing components that are in contact therewith from sliding and from going back down into the bottom 11b of the bowl. Thus, the components can be taken to the downstream end 7b of the upper strand 7 of the conveyor belt 6 where the conveyor belt 6 reaches its position for returning in the opposite direction along arrow 8b. It can be understood that any component that has reached the downstream end 7b then drops by gravity into the removal conveyor 3 of the installation 1, the conveyor belt 6 then continuing to return empty along its lower strand 8.

It can also be understood that when the upstream and downstream drums 9 and 10 rotate in the opposite direction as shown by arrow 17, the conveyor belt 6 moves in the direction of arrows 18a and 18b, thereby making it possible to discharge components conversely from the upstream end 7a of the upper strand 7 of the conveyor belt 6 on the same operating principle, the slats 19 then preventing components dropping because of the angle of inclination of the upstream face 11a of the bowl. This reversal of the direction of rotation can be advantageous, in particular in order to empty the bowl and place components of some other type in the feed device 2.

In order to contain the components appropriately in position on the upper strand 7 of the conveyor belt 6, that is in a bowl configuration, the enclosure 5 has two sides 5a, 5b that can be seen in FIG. 2, these sides 5a and 5b being arranged vertically adjacent to the respective sides 20a, 20b of the conveyor belt 6. The vertical positioning of these sides 5a, 5b of the enclosure 5 is also possible because the upper strand 7 of the conveyor belt 6 is arranged in a bowl shape, with the components placed in bulk in the bowl being stirred, this stirring preventing any blockage or jamming of said components when the conveyor belt 6 moves. These sides 5a, 5b of the enclosure 5 are constituted by two vertical plates adjacent to the sides 20a, 20b of the conveyor belt 6.

An upstream support plate 21 and a downstream support plate 22 can be seen in FIG. 1 arranged inside the conveyor belt 6 and bearing against the inside face 6b of the upper strand 7. It can be seen that these upstream and downstream support plates 21 and 22 are arranged at an angle of inclination that serves to define the angle of inclination of the upstream and downstream faces 11a and 11b of the bowl. This angle of inclination makes it possible to influence the return of the components to the bottom 11b of the bowl. It is also possible to envisage means for adjusting the angle of inclination of the upstream and downstream support plates 21 and 22 so as to modify the angle of inclination of the upstream and downstream faces 11a and 11c of the bowl, in particular as a function of the type of component arranged in the feed device 2. By way of example, such adjustment means may be provided by mounting the first ends 21a, 22a of the upstream and downstream support plates 21 and 22 to pivot about axes that extend transversely relative to the sides 5a, 5b of the enclosure 5, with the second ends 21b, 22b of these upstream and downstream support plates 21 and 22 being mounted to move in circular translation relative to said sides 5a, 5b of the enclosure 5, locking means being provided, e.g. locking screws, between the second ends 21b, 22b and the sides 5a, 5b.

A central support plate 23 can also be seen in FIG. 1, this central support plate 23 bearing against the inside face 6b of the upper strand 7. This central support plate 23 serves in particular to avoid any contact with the lower strand 8 of the conveyor belt. In addition, the two return rollers 13 and 14 that serve to tension the lower strand 8 of the conveyor belt 6 are arranged far enough away from the upstream and downstream drums 9 and 10 to likewise avoid any contact with the bottom 12b of the bowl.

Other characteristics may be envisaged without going beyond the ambit of the present invention. In particular, it is possible to envisage variant retaining means to replace the slats 19. It is also possible to provide an installation having a plurality of feed devices 2 arranged side by side, given the vertical position of the sides 5a, 5b of the enclosure 5 and the way components are filled into the feed device 2 via its upstream end 2a, thereby limiting the overall size of the installation, each device then being adapted to the type of component it is to receive.

It is also possible to provide a feed device 2 of the invention from which the upstream, downstream, and central support plates 21, 22, and 23 are omitted, with the upper strand 7 of the conveyor belt 6 then merely being suspended from its ends 7a, 7b between the upstream and downstream drums 9 and 10, thereby forming a bowl.

In this example, components are poured onto the conveyor belt in such a manner as to fill the bowl to a depth that corresponds substantially to the height of the downstream cylinder 10. Thereafter, the operator puts the device of the invention into operation so that it conveys and delivers components in regular manner.

The invention claimed is:

1. A component feed device serving to meter the delivery of components, in particular to a workstation, the device comprising:
    an enclosure;
    a conveyor belt incorporated in the enclosure;
    the conveyor belt being mounted in a loop and having an upper strand on which the components rest while being transported and a lower strand for returning empty;
    a drive device for driving the conveyor belt in a loop;
    a holder device configured to contain the components on the upper strand of the conveyor belt, said holder device being constituted by two vertical plates of the enclosure located beside the sides of the conveyor belt,
        the upper strand of the conveyor belt being configured to form a bowl-shaped container having an upstream face, a bottom, and a downstream face, said upstream and downstream faces being configured to encourage components to move down under gravity to the bottom of the container, the conveyor belt having an outside face and an inside face, the outside face having a component retaining device configured to retain the components resting on said outside face at least when they are situated on the downstream face;
    a downstream drum being arranged to return the conveyor belt at an downstream end;
    an upstream drum being arranged to return the conveyor belt at an upstream end,
        the upstream and downstream drums being spaced apart from each other in a configuration that enables the upper strand of the conveyor belt to be kept slack,
        wherein an upstream support plate and a downstream support plate are arranged at an angle of inclination under the upper strand of the conveyor belt, respectively in regions of the upstream and downstream faces, said upstream and downstream support plates forming a V-shape between each other by bearing against the inside face of said upper strand of the conveyor belt; and
    an adjustment device being configured to modify the angle of inclination of the upstream and downstream support plates.

2. The component feed device according to claim 1, wherein:
    two return rollers are arranged to bear against the inside face of the lower strand of the conveyor belt,
        the two return rollers being arranged lower than the upstream and downstream drums so as to avoid any contact between the upper and lower strands of the conveyor belt.

3. The component feed device according to claim 1, wherein the upstream drum and the downstream drum are arranged at substantially identical heights.

4. The component feed device according to claim 1, wherein a central support plate is arranged under the upper strand of the conveyor belt in the region of the bottom of the container and bears against the inside face of said upper strand of the conveyor belt, said central support plate being configured to support the bottom of the container and avoid any contact with the lower strand of the conveyor belt.

5. The component feed device according to claim 1, wherein the drive device comprise at least one motor configured to drive at least one of the upstream and downstream drums in rotation.

6. The component feed device according to claim 5, wherein the drive device comprises a motor driving the downstream drum and a transmission system arranged between the motor and the upstream drum.

7. The component feed device according to claim 1, wherein said upstream and downstream support plates each have first and second ends, said adjustment device comprising axes about with the first ends of the upstream and downstream support plates are arranged to pivot, the second ends of the upstream and downstream support plates being mounted to move in a circular translation relative to the sides of the enclosures.

8. The component feed device according to claim 7, wherein said axes extend transversely relative to the sides of the enclosure.

9. The component feed device according to claim 1, wherein the retaining device is constituted by slats arranged transversely on the outside face of the conveyor belt with gaps between them.

10. The component feed device according to claim 9, wherein the slats are spaced apart at a distance lying in the range 30 cm to 70 cm.

11. An installation comprising a plurality of components having a component thickness, and a component feed device serving to meter the delivery of components, in particular to a workstation, the device comprising:
   an enclosure;
   a conveyor belt incorporated in the enclosure,
      the conveyor belt being mounted in a loop and having an upper strand on which the components rest while being transported and a lower strand for returning empty;
   a drive device for driving the conveyor belt in a loop;
   a holder device configured to contain the components on the upper strand of the conveyor belt, said holder device being constituted by two vertical plates of the enclosure located beside the sides of the conveyor belt,
      the upper strand of the conveyor belt being configured to form a bowl-shaped container having an upstream face, a bottom, and a downstream face, said upstream and downstream faces being configured to encourage components to move down under gravity to the bottom of the container, the conveyor belt having an outside face and an inside face, the outside face having a component retaining device configured to retain the components resting on said outside face at least when they are situated on the downstream face,
      the retaining device is constituted by slats arranged transversely on the outside face of the conveyor belt with gaps between them,
      the slats present a height which is substantially equal to the component thickness;
   a downstream drum being arranged to return the conveyor belt at an downstream end;
   an upstream drum being arranged to return the conveyor belt at an upstream end,
      the upstream and downstream drums being spaced apart from each other in a configuration that enables the upper strand of the conveyor belt to be kept slack,
      wherein an upstream support plate and a downstream support plate are arranged at an angle of inclination under the upper strand of the conveyor belt, respectively in regions of the upstream and downstream faces, said upstream and downstream support plates forming a V-shape between each other by bearing against the inside face of said upper strand of the conveyor belt; and
   an adjustment device being configured to modify the angle of inclination of the upstream and downstream support plates.

12. The installation according to claim 11, wherein two return rollers are arranged to bear against the inside face of the lower strand of the conveyor belt, the two return rollers being arranged lower than the upstream and downstream drums so as to avoid any contact between the upper and lower strands of the conveyor belt.

13. The installation according to claim 11, wherein the upstream drum and the downstream drum are arranged at substantially identical heights.

14. The installation according to claim 11, wherein a central support plate is arranged under the upper strand of the conveyor belt in the region of the bottom of the container and bears against the inside face of said upper strand of the conveyor belt, said central support plate being configured to support the bottom of the container and avoid any contact with the lower strand of the conveyor belt.

15. The installation according to claim 11, wherein said upstream and downstream support plates each have first and second ends, said adjustment device comprising axes about with the first ends of the upstream and downstream support plates are arranged to pivot, the second ends of the upstream and downstream support plates being mounted to move in a circular translation relative to the sides of the enclosures.

16. The installation according to claim 15, wherein said axes extend transversely relative to the sides of the enclosure.

17. An installation for packaging liquids in bottles that are closed by means of stoppers, said installation comprising at least a component feed device serving to meter the delivery of components, in particular to a workstation, the device comprising:
   an enclosure;
   a conveyor belt incorporated in the enclosure,
      the conveyor belt being mounted in a loop and having an upper strand on which the components rest while being transported and a lower strand for returning empty;
   a drive device for driving the conveyor belt in a loop;
   a holder device configured to contain the components on the upper strand of the conveyor belt, said holder device being constituted by two vertical plates of the enclosure located beside the sides of the conveyor belt,
      the upper strand of the conveyor belt being configured to form a bowl-shaped container having an upstream face, a bottom, and a downstream face, said upstream and downstream faces being configured to encourage components to move down under gravity to the bottom of the container, the conveyor belt having an outside face and an inside face, the outside face having a component retaining device configured to retain the components resting on said outside face at least when they are situated on the downstream face;
   a downstream drum being arranged to return the conveyor belt at an downstream end;
   an upstream drum being arranged to return the conveyor belt at an upstream end,
      the upstream and downstream drums being spaced apart from each other in a configuration that enables the upper strand of the conveyor belt to be kept slack,
      wherein an upstream support plate and a downstream support plate are arranged at an angle of inclination under the upper strand of the conveyor belt, respectively in regions of the upstream and downstream faces, said upstream and downstream support plates forming a V-shape between each other by bearing against the inside face of said upper strand of the conveyor belt; and
   an adjustment device being configured to modify the angle of inclination of the upstream and downstream support plates.

18. The installation according to claim 17, having a removal conveyor arranged below the downstream end of the conveyor belt, said removal conveyor feeding a workstation for stopping bottles.

19. A method for filling a container using the feed device according to claim 1, comprising pouring components into the enclosure in such a manner as to fill the bowl-shaped container completely before putting said device into operation.

20. The method according to claim 19, wherein the components are stoppers for bottles.

21. The method according to claim 19 using the feed device according to claim 2, wherein the components are poured into the enclosure in such a manner as to fill the bowl-shaped container, the components being poured to a depth corresponding to the height of the downstream drum.

22. The method according to claim 21, wherein the components are stoppers for bottles.

* * * * *